(12) United States Patent
Yoshimura et al.

(10) Patent No.: US 6,383,358 B2
(45) Date of Patent: May 7, 2002

(54) METHOD FOR FORMING A THIN FILM

(75) Inventors: Masahiro Yoshimura; Takeshi Fujiwara, both of Kanagawa Pref.; Seung-wan Song; Tomoaki Watanabe, both of Tokyo; Ryo Teranishi, Kanagawa Pref., all of (JP); Kyoo-Seung Han, Taejeon (KR)

(73) Assignee: Tokyo Institute of Technology, Tokyo (JP)

( * ) Notice: Subject to any disclaimer, the term of this patent is extended or adjusted under 35 U.S.C. 154(b) by 0 days.

(21) Appl. No.: 09/810,782

(22) Filed: Mar. 16, 2001

(30) Foreign Application Priority Data

Mar. 17, 2000 (JP) .......................................... 2000-76575

(51) Int. Cl.$^7$ .......................... C25D 11/00; C25D 21/10
(52) U.S. Cl. ...................................... 205/148; 205/333
(58) Field of Search .................................. 205/148, 333

(56) References Cited

U.S. PATENT DOCUMENTS

| | | | |
|---|---|---|---|
| 3,520,780 A | | 7/1970 | Findl et al. ..................... 204/3 |
| 4,731,168 A | * | 3/1988 | MacIntyre ..................... 204/80 |
| 5,597,661 A | | 1/1997 | Takeuchi et al. ............... 429/42 |

OTHER PUBLICATIONS

Yoshimura et al. "Direct Fabrication Of Thin–Film Linio$_2$ Electrodes In Lioh Solution By Electrochemical–Hydrothermal Method." Solid State Ionics 106 (1998) pp. 39–44. No month available.

Han et al. "Simultaneous And Direct Fabrication Of Lithium Cobalt Oxide Film And Powder Using Soft Solution Processing At 100° C." Electromechanical and Soli–State Letters. 2(2) Feb. 1999. pp. 63–66.

* cited by examiner

Primary Examiner—Edna Wong
(74) Attorney, Agent, or Firm—Knobbe, Martens, Olson and Bear, LLP.

(57) ABSTRACT

A first reactive solution is made of a water solution composed of LiOH.7H$_2$O melted in distilled water, and a second reactive solution is made of a water solution composed of CoSO$_4$.7H$_2$O melted in distilled water. Then, the first and the second reactive solutions are put in a flow-type reactor with a pair of electrodes and a porous base material provided in between the pair of electrodes therein. The first reactive solution is flown in between one electrode and the porous base material at its given flow rate, and the second reactive solution is flown in between the other electrode and the porous base material at its given flow rate. Then, a given voltage is applied between the pair of electrodes to synthesize a compound thin film including the components of the first and the second reactive solutions directly on the porous base material.

7 Claims, 2 Drawing Sheets

METHOD FOR FORMING A THIN FILM

BACKGROUND OF THE INVENTION

1. Field of the Invention

This invention relates to a method for forming a thin film, particularly to a method for forming a thin film suitable for a secondary battery field usable for mobile electronic device and electric automobiles.

2. Related Art Statement

So far, a sol-gel method, a CVD method or a PVD method is employed as a thin film-forming method. These methods require a firing process after a molding process, a high vacuum condition, or a high energy condition accompanied with a substrate-heating process or a plasma-generating process. Therefore, those methods require large scale and complicate apparatus, resulting in large cost and complicate operationality in use.

Moreover, the above high energy condition runs counter to global environmental protection, resource saving and energy saving. Therefore, a new thin film-forming method without the above high energy condition has been desired.

SUMMARY OF THE INVENTION

It is an object of the present invention to provide a new thin film-forming method not including a high energy condition due to firing, heating or plasma generation.

This invention relates to a method for forming a thin film comprising the steps of:

setting a porous base material in between a pair of electrodes, flowing a first reactive solution in between one electrode of the pair of electrodes and the base material, flowing a second reactive solution in between the other electrode of the pair of electrodes and the base material, and applying a given voltage between the pair of electrodes, thereby to synthesize a compound thin film including the components of the first reactive solution and the second reactive solution on the porous base material.

The inventors related to the present invention have been intensely studied for developing a new thin film-forming method not including a high energy process. As a result, they have found out surprisingly that when a porous base material is set in between an anode electrode and a cathode electrode to which a given voltage is applied and a first reactive solution and a second reactive solution, which are different each other, are flown in between the cathode electrode and the base material and in between the anode electrode and the base material at their predetermined flow rates, respectively, a compound thin film including the components of the first reactive solution and the second reactive solution is directly synthesized on the base material.

FIG. 1 is a conceptual view showing the state in which the compound thin film is synthesized directly on the porous base material.

In this case, the first reactive solution is made of a water solution with a melted LiOH.H$_2$O in a distilled water, and the second reactive solution is made of a water solution with a melted CoSO$_4$.7H$_2$O in a distilled water.

The first reactive solution is flown in between a cathode electrode 1 and a porous base material 3 at its given flow rate, and the second reactive solution is flown in between an anode electrode 2 and the porous base material 3 at its given flow rate. When a given voltage is applied between the cathode electrode 1 and the anode electrode 2, the first and the second reactive solutions are dissociated, and thus, Li$^+$ ion particles exist in between the cathode electrode 1 and the porous base material 3 and Co$^{3+}$ ion particles exist in between the anode electrode 2 and the porous base material 3.

Then, these ion particles arrive at the porous base material, and the Li$^+$ ion particles and the Co$^{3+}$+ion particles pass through the surface inter-connecting holes of the base material 3 and arrive at the opposite surfaces 3B and 3A thereof, respectively. The Li$^+$ ion particles on the surface 3B react with a large amount of Co$^{3+}$ ion particles and oxide elements in the water solution to form a Co-based oxide thin film, made of LiCoO$_2$ or the like, on the surface 3B of the porous base material 3.

Moreover, the Co$^{3+}$ ion particles on the surface 3A react with a large amount of Li$^+$ ion particles and oxide elements in the water solution to form a Co-based oxide thin film, made of LiCoO$_2$ or the like, on the surface 3A of the porous base material 3. As a result, a compound oxide thin film such as the Co-based oxide thin film is directly synthesized and stabilized on the porous base material.

In this case, if the difference in the flow rates and/or the pressures between the first and the second reactive solutions is controlled appropriately, the compound oxide thin film may be formed on either of the surfaces 3A and 3B or in the porous base material 3.

In the thin film-forming method of the present invention, since the reactive solutions are flown constantly, the component particles such as the Co$^{3+}$ ion particles and the Li$^+$ ion particles to constitute the compound thin film always exist at their constant ratio. Therefore, the compound thin film can be formed uniformly, and a particulate compound or a powdery compound is not formed.

According to the thin film-forming method of the present invention, the crystalline compound thin film can be formed on the porous base material without a firing process after a thin film-forming process and a high energy condition including a substrate-heating process and a plasma generation

BRIEF DESCRIPTION OF THE DRAWINGS

The invention will be more particularly described with reference to the accompanying drawings.

DESCRIPTION OF THE PREFERRED EMBODIMENTS

Figure 1:
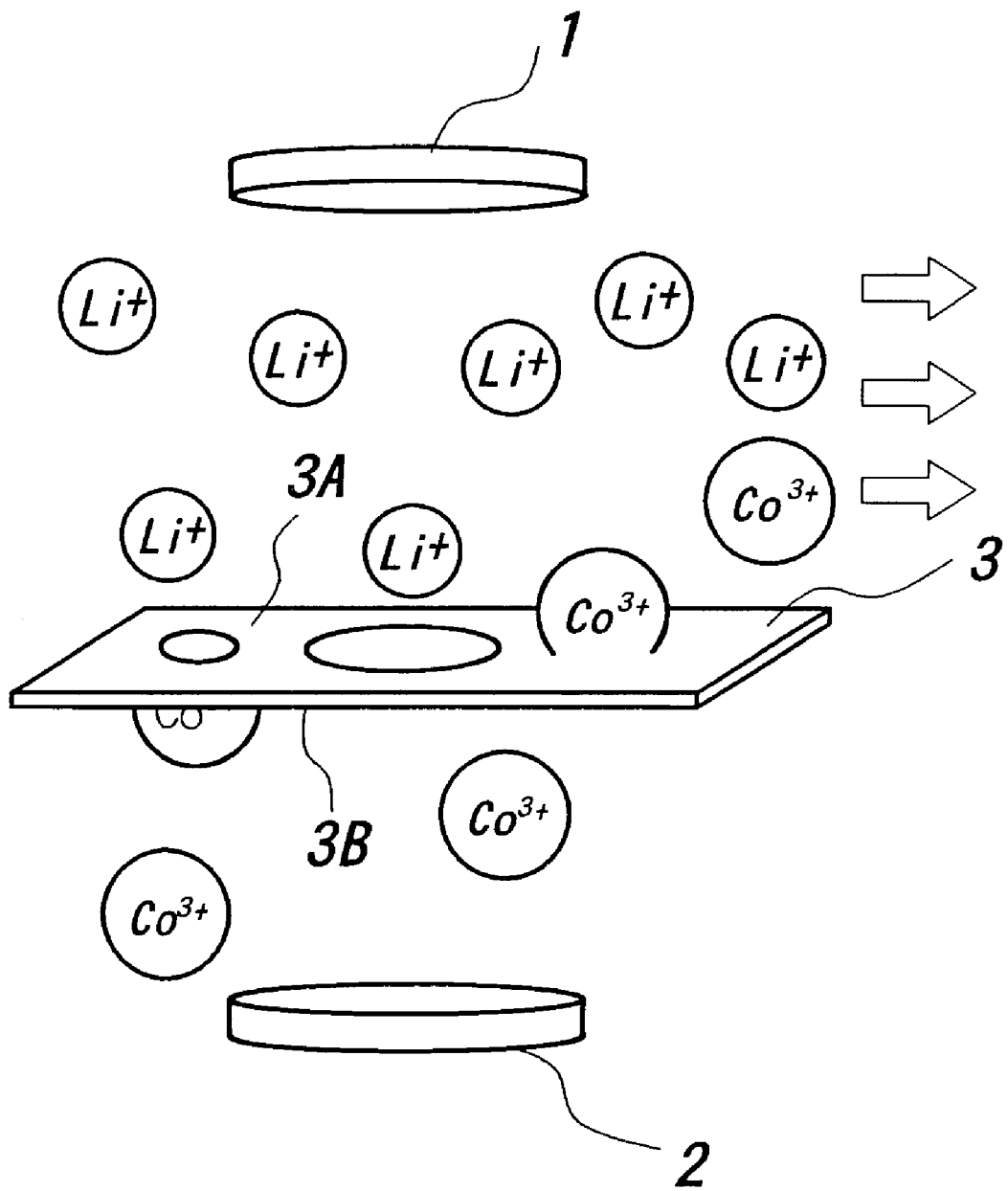
FIG. 1 is a conceptual view for explaining a thin film-forming method according to the present invention.

The invention will be described in detail as follows.

The flow rate of the first reactive solution in the thin film-forming method of the present invention is not restricted only if the compound thin film can be uniformly synthesized directly on the porous base material. Preferably, the flow rate of the first reactive solution is set within 0.001–100 mL/minute, particularly 0.1–10 mL/minute. Thereby, the compound thin film can be made uniformly irrespective of the kinds of the first reactive solution and the porous base material.

Moreover, the flow rate of the second reactive solution is not restricted only if the compound thin film can be uniformly synthesized directly on the porous base material. However, preferably, the flow rate of the second reactive solution is set within 0.001–100 mL/minute, particularly 0.1–10 mL/minute on the basis of the above same reason.

The amplitude of the voltage to be applied between the pair of electrodes, the cathode electrode and the anode electrode, is not restricted only if the compound thin film can be uniformly synthesized directly on the porous base material as mentioned above. Preferably, the amplitude of the voltage is selected so that a current with a current density of 0.01–10 mA/cm$^3$ is flown in between the pair of electrodes. In this case, reactive elements such as the Li$^+$ ion particles and the Co$^{3+}$ ion particles can be always produced at their optimum rates, and thus, the compound thin film can be always synthesized uniformly.

In the thin film-forming method of the present invention, an additional energy process such as a heating process is not always excluded. For example, it is desired to heat the first and the second reactive solutions to 60–300° C., particularly 80–200° C. In this case, the compound thin film can be uniformly synthesized on the porous base material effectively, and the crystallinity and the density of the compound thin film can be enhanced, irrespective of the kinds of the reactive solutions.

Generally, a base material is heated to 500–800° C. in a CVD method. Therefore, the above heating process of the thin film-forming method of the present invention is remarkably small in energy, compared with the above high energy process in the CVD method, etc.

Moreover, since not-reacted component elements remain in their respective reactive solutions, they can be easily retrieved, reproduced or circulated, so that environmental pollution can be repressed. On the other hand, since it is difficult to retrieve gaseous component elements because they diffuse in atmosphere immediately, the environmental pollution may occur to some degree.

The first reactive solution and the second reactive solution are selected on the kind of the compound thin film to be produced. The concentrations of the first and the second reactive solutions are determined on the thin film-forming rate and the physical properties of the compound thin film such as density.

Moreover, the pair of electrodes, the cathode electrode and the anode electrode, may be made of a well known electrode material such as carbon material, platinum material or cobalt material.

The porous base material may be made of TEFLON, paper or cloth.

In the case of forming an oxide thin film by the thin film-forming method of the present invention, it is desired to incorporate an oxidizer into at least one of the first reactive solution and the second reactive solution. Therefore, the reactive component elements such as the Co$^{3+}$ ion particles and the Li$^+$ ion particles can be easily reacted with oxygen elements, and thus, the oxide thin film can be easily formed uniformly and densely.

In this case, a well known oxidizer such as $Na_2S_2O_3$ or $H_2O_2$ can be used. Particularly, in the case of forming a Co-based oxide thin film as will be described below, $Na_2S_2O_3$ or $H_2O_2$ is preferably used as the above oxidizer.

The thin film-forming method can be applied for any compound thin film, but may be preferably for the Co-based oxide thin film such as $LiCoO_2$, which is used as an electrode material of a lithium ion secondary battery, a V-based oxide thin film, a Mn-based oxide thin film, a Fe-based oxide thin film, a W-based oxide thin film and a Mo-based oxide thin film, which are employed as a fluorescent material and a luminescence material.

EXAMPLE

This invention will be concretely described with reference to the following examples.

First of all, 100 mL of a water solution composed of $LiOH.H_2O$ melted in distilled water was made as the first reactive solution. Then, a water solution composed of $CoSO_4.7H_2O$ melted in distilled water was made as the second reactive solution. Subsequently, 10 mL of 1 mol/L-$Na_2S_2O_3$ was added, as an oxidizer, to the second reactive solution so that the total amount the second reactive solution and the oxidizer is set to 100 mL. A pair of carbon electrodes were set in a flow-type reactor, and a porous base material made of TEFLON was arranged in between the carbon electrodes.

The first reactive solution was flown in between one carbon electrode and the porous base material at a flow rate of 1.7 mL/minute and the second reactive solution was flown in between the other carbon electrode and the porous base material at a flow rate of 1.7 mL/minute with applying a voltage of 5V between the carbon electrodes.

Moreover, the first and the second reactive solutions were kept to 100° C. In this case, a current density between the carbon electrodes was 0.2 A/cm$^2$.

30 minutes later, the porous base material was taken out of the flow-type reactor, and washed and dried. Then, the surface of the porous base material was analyzed by X-ray diffraction. The thus obtained X-ray diffraction pattern was shown in FIG. 2.

Figure 2:
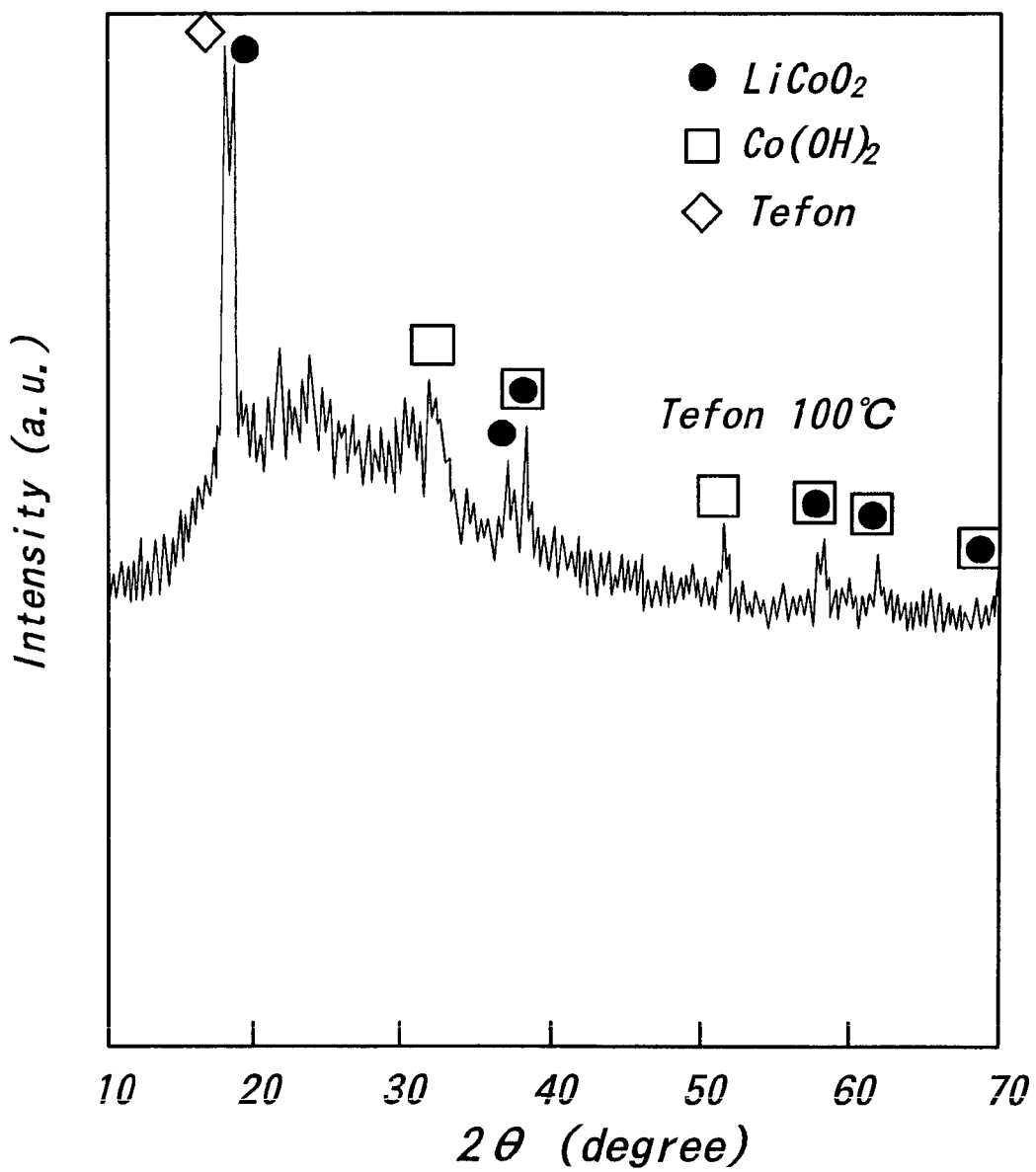
FIG. 2 is a graph showing a X-ray diffraction spectrum of a Co-based oxide thin film synthesized by the thin film-forming method of the present invention.

As is apparent from FIG. 2, diffraction peaks from $LiCoO_2$ and $Co(OH)_2$ are observed on the surface of the porous base material. That is, it is turned out that a compound thin film made of $LiCoO_2$ crystal, composed of Li element of the first reactive solution and Co element of the second reactive solution, is formed on the porous base material.

Although this invention has been described in detail with reference to the above examples, this invention is not limited to the above disclosure and every kind of variation and modification may be made without departing from the scope of the present invention.

For example, in the above example, the first reactive solution and the second reactive solution are made of the water solution in which only one substance such as $LiOH.H_2O$ or $CoSO_4.7H_2O$ is melted in distilled water. However, the reactive solutions may be made of a water solution in which two or more substances are melted, depending on the composition of the compound thin film.

According to the present invention, a compound thin film can be directly synthesized on a porous material without a firing process in a conventional sol-gel method or a high energy condition including a high temperature substrate heating process or a plasma-generating process in a conventional CVD method or PVD method. As a result, a new thin film-forming method not including the high energy condition can be provided.

What is claimed is:

1. A method for forming a thin film comprising the steps of:

setting a porous base material in between a pair of electrodes, flowing a first reactive solution in between one electrode of the pair of electrodes and the base material, flowing a second reactive solution in between the other electrode of the pair of electrodes and the base material, and applying a given voltage between the pair of electrodes, thereby to synthesize a compound thin film including the components of the first reactive solution and the second reactive solution on the porous base material.

2. A method for forming a thin film as defined in claim 1, wherein the flow rate of the first reactive solution is set within 0.001–100 mL/minute.

3. A method for forming a thin film as defined in claim 1, wherein the flow rate of the second reactive solution is set within 0.001–100 mL/minute.

4. A method for forming a thin film as defined in any one of claims 1 or 3, wherein the first reactive solution and the second reactive solution are heated to 40–300° C.

5. A method for forming a thin film as defined in any one of claims 1 or 3, further comprising the step of adding an oxidizer into at least one of the first reactive solution and the second reactive solution, whereby an oxide thin film is synthesized on the porous base material.

6. A method for forming a thin film as defined in claim 5, wherein the first reactive solution is made of a water solution composed of $LiOH.H_2O$ melted in distilled water and the second reactive solution is made of a water solution composed of $CoSO_4.7H_2O$ melted in distilled water, and the compound thin film is a Co-based oxide thin film.

7. A method for forming a thin film as defined in claim 6, wherein the oxidizer is composed of $Na_2S_2O_3$ or $H_2O_2$.

* * * * *